US008265674B2

(12) United States Patent
Choong et al.

(10) Patent No.: US 8,265,674 B2
(45) Date of Patent: Sep. 11, 2012

(54) WIRELESS SYSTEM COMMISSIONING

(75) Inventors: Jason Yew Choo Choong, San Jose, CA (US); Peter Graeme Cobb, Wonga Park (AU)

(73) Assignee: Daintree Networks, Pty. Ltd., Scoresby (AU)

( * ) Notice: Subject to any disclaimer, the term of this patent is extended or adjusted under 35 U.S.C. 154(b) by 407 days.

(21) Appl. No.: 12/684,576

(22) Filed: Jan. 8, 2010

(65) Prior Publication Data
US 2011/0172844 A1 Jul. 14, 2011

(51) Int. Cl.
*H04Q 7/20* (2006.01)
(52) U.S. Cl. ..... 455/500; 455/507; 455/515; 455/426.1; 455/422.1; 455/403; 370/310; 370/401; 370/463; 340/3.1
(58) Field of Classification Search ............... 455/500, 455/507, 515, 522, 550.1, 422.1, 404.1, 69, 455/445, 426.1, 426.2; 370/310, 401, 463; 340/3.1, 41.2
See application file for complete search history.

(56) References Cited

U.S. PATENT DOCUMENTS

| 7,020,701 | B1 | 3/2006 | Gelvin et al. | |
|---|---|---|---|---|
| 7,623,042 | B2 | 11/2009 | Huizenga | |
| 2007/0121648 | A1 | 5/2007 | Hahn | |
| 2008/0030075 | A1* | 2/2008 | Stanley et al. | 307/11 |
| 2009/0066473 | A1 | 3/2009 | Simons | |
| 2011/0090042 | A1* | 4/2011 | Leonard et al. | 340/5.1 |

FOREIGN PATENT DOCUMENTS

WO 2006/095317 A1 9/2006

OTHER PUBLICATIONS

"Photosensor Dimming: Solutions." Retrieved from internet http://www.lrc.rpi.edu/researchAreas/reducingBarriers/photosensorSolutions.asp, date unknown, 2 pages.
International Search Report and the Written Opinion of the International Searching Authority, PCT/US2001/020444, Sep. 15, 2011.
Notification Concerning Transmittal of Copy of International Preliminary Report on Patentability, PCT/US2001/020444, Jul. 19, 2012, 6 pages.

* cited by examiner

*Primary Examiner* — Keith Ferguson
(74) *Attorney, Agent, or Firm* — Fish & Richardson P.C.

(57) ABSTRACT

Methods, systems, and apparatus, including computer programs encoded on a computer storage medium, for commissioning a wireless network. In one aspect, a method includes instructing the switch devices of the controlled circuits to provide power to the controlled circuit wiring of the controlled circuits to enable joining of wireless adapters to the wireless network; monitoring the joining of wireless adapters to the wireless network; monitoring for the occurrence of a joining expiration event; and in response to the occurrence of the joining expiration event, determining whether each wireless adapter that joined the wireless network during a joining time period ending at the occurrence of the joining expiration event belongs to the controlled circuits.

26 Claims, 8 Drawing Sheets

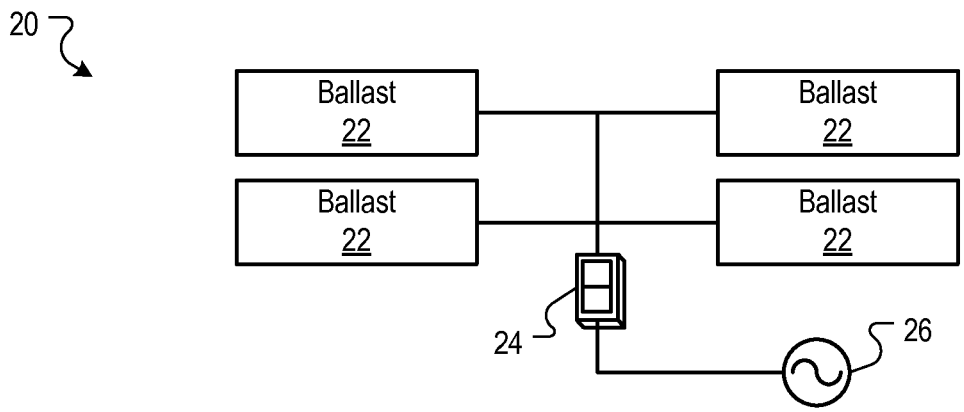
FIG. 1A - PRIOR ART
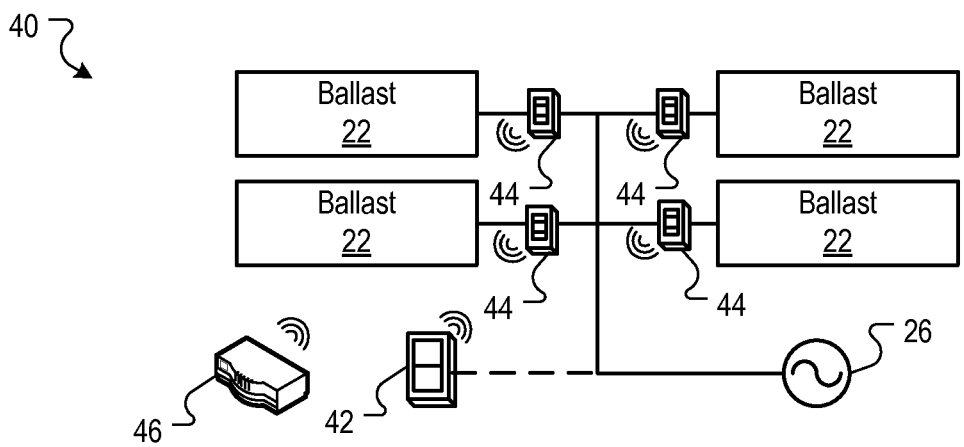
FIG. 1B - PRIOR ART
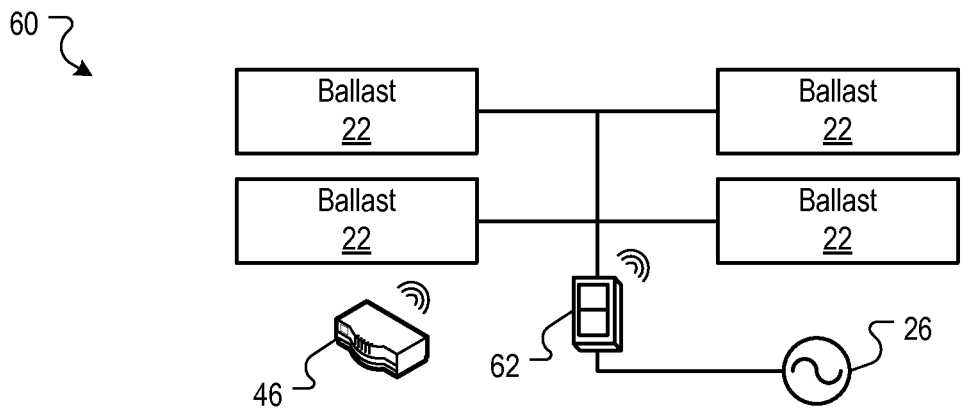
FIG. 1C - PRIOR ART

WIRELESS SYSTEM COMMISSIONING

BACKGROUND

This specification relates to controlled circuits in wireless networks and commissioning devices in the wireless networks.

Wireless network control systems are becoming more prevalent in commercial and residential use, particularly in the areas of automation and environmental control. Two recurring issues with introducing any form of wireless controls to any building system (such as lighting and HVAC) is the effort and cost associated with introducing control wiring and the associated commissioning required to set up the system. Wireless controls can help minimize the wiring requirements, but systems that fully integrate the wireless controls into the components that require control, e.g., the ballasts, or power supplies, are still in development. Furthermore, the vast majority of buildings are of "all copper" design, and thus it is not cost effective to entirely remove the existing wiring and replace it entirely with a wirelessly controlled system. Thus, a technique that is often used is to provide wireless adaptation. This typically takes the form of a device that adapts between the wireless domain and the existing wired domain. In the case of a ballast, this could take the form of a device that has a wireless transceiver and line voltage (and possibly say, 0-10V dimming wires) to the ballast, and logic to convert between the two domains.

FIGS. 1A-AC are block diagrams illustrating prior art lighting control systems 20, 40 and 60. The system 20 is of a wired design. It includes four ballasts 22 that are connected to a wall switch 24. The ballasts 22 can, for example, be lighting ballasts in a conference room that power fluorescent lights. The wall switch 24, in turn, is connected to a power source 26, e.g., a single phase AC power line. The wall switch 24 is a manually activated switch that provides a connection or breaks a connection to the power source 26.

The system 40 is a full wireless adaptation topology that interposes wireless adapters 44 between the power source 26 and each ballast 22. The wireless adapters 44 are powered by the power source 26, and a wireless switch device 42 controls the wireless adapters 44. The switch device 42 can also be powered by the power source 26, or can run on battery power. The system of FIG. 1B requires significant rewiring, which increases retrofitting costs, and also commits the building owner to wirelessly adapting all ballasts because the switch device 42 no longer controls the power coupling from the power source 26.

The system 60 illustrates a "lite" wireless adaptation. The topology of the system 60 is much simpler than that of the system 40, and has the benefit of requiring no wiring changes. The system 60 simply requires the replacement of the wall switch 24 with a wireless version 62. However, with the system 60, granular controls, e.g., different settings for different ballasts, cannot be achieved, and thus many of the advantages and flexibilities gained by wireless control systems cannot be achieved.

In addition to wiring and topology considerations, another issue that must be dealt with is commissioning. Commissioning is the process of setting up a wireless network. In its broadest sense, commissioning covers a wide range of tasks including surveying the radio and physical environment, placement of devices, configuration of parameters, and testing and verification of correct operation.

Commissioning tools are designed to facilitate commissioning of wireless networks for installers. The commissioning tools typically run on another wireless device with commissioning capabilities (e.g., device 46 of FIGS. 1B and 1C), or laptop or handheld device. The commissioning tools provide visualization of the network and devices, and provide options to configure, commission and manage the wireless system.

As the number of controlled circuits in a building increases, so does the commissioning process, as each of the wireless adapters needs to be commissioned onto a wireless network and assigned to the appropriate controllable zone for control. FIG. 2 is a block diagram 80 illustrating network controlled circuits arranged by zones and network segments 82, 84 and 86 according to a floor plan. The diagram 80 illustrates three wireless network segments (i.e., three independent wireless networks that are intended to be operated as part of the overall system). Devices that are on different wireless network segments cannot communicate to each other wirelessly, except by means of a gateway.

The segments each include multiple controlled circuits configured according to multiple zones, the latter of which are logical groupings of wireless devices that facilitates control of the devices as a single entity. The example zones including pairings of a single wireless switch to a single wireless adapter (e.g., zone 92), pairings of a single wireless switch to multiple wireless adapters (e.g., zone 94), and pairings of multiple wireless switches to multiple wireless adapters for two-way or multi-way switching (e.g., zones 96 and 98). The task of ensuring that wireless devices are on the correct wireless network segment and ensuring that device zones are properly assigned, even for a relatively modest number of adapters and switches, can become complex and labor intensive. Manual methods of sequentially identifying each device, and then assigning them to a zone, exist but are extremely time consuming and labor intensive.

SUMMARY

This specification describes technologies relating to wireless system commissioning and optimization. In general, one innovative aspect of the subject matter described in this specification can be embodied in methods that include the actions of selecting controlled circuits in a wireless network, each of the controlled circuits comprising a switch device connected to a power circuit and connected to controlled circuit wiring, the switch device configured to control power provided by the power circuit to the controlled circuit wiring, to receive data wirelessly, to transmit data wirelessly and to take one or more control actions in response to the received data and the transmitted data, and at least one wireless adapter connected to the controlled circuit wiring and connected to a controlled device, the wireless adapter powered by the controlled circuit wiring and configured to control power at the controlled device; instructing the switch devices of the controlled circuits to provide power to the controlled circuit wiring of the controlled circuits to enable joining of wireless adapters to the wireless network; monitoring the joining of wireless adapters to the wireless network; monitoring for the occurrence of a joining expiration event; and in response to the occurrence of the joining expiration event, determining whether each wireless adapter that joined the wireless network during a joining time period ending at the occurrence of the joining expiration event belongs to the controlled circuits. Other embodiments of this aspect include corresponding systems, apparatus, and computer programs, configured to perform the actions of the methods, encoded on computer storage devices.

Particular embodiments of the subject matter described in this specification can be implemented so as to realize one or more of the following advantages. Multiple wireless devices can be automatically commissioned and assigned to zones without prior knowledge (e.g., a device list) of the devices. The risk of erroneous commissioning, where, for instance, a switch is commissioned to control the wrong lights, is reduced. Partial wireless control deployments (which lower the deployment costs), such as wirelessly enabling only those lights that require dimming (for instance, only those near the windows), can be achieved, in contrast to traditional wireless deployment methods such as the one described in FIG. 1B. Lower power consumption by the wireless adapter can be achieved because the wireless adapter is turned off when the lights are turned off, in contrast to traditional wireless deployment methods such as the one described in FIG. 1B. Costs associated with retrofitting and commissioning wireless control into a wired system are reduced. Each of these advantages can be separately realized, and a particular implementation need not realize all or any of the advantages.

The details of one or more embodiments of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

FIGS. 1A-1C are block diagrams illustrating prior art lighting control systems.

Like reference numbers and designations in the various drawings indicate like elements.

DETAILED DESCRIPTION

§1.0 Overview

Figure 3A:
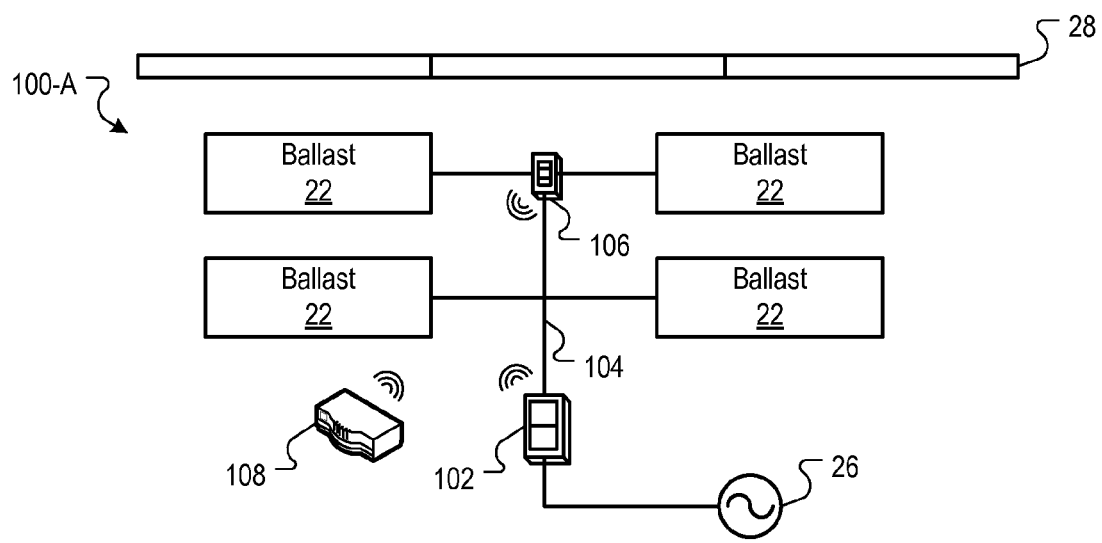
FIGS. 3A-3C are block diagrams illustrating controlled circuits in a wirelessly controlled network.
Figure 3B:
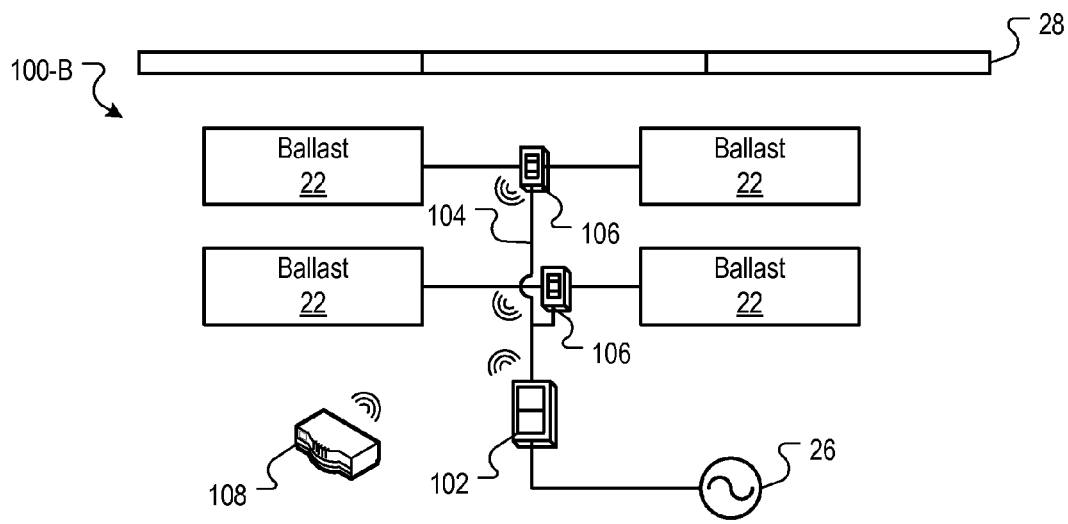

FIGS. 3A and 3B are block diagrams illustrating controlled circuits 100-A, 100-B and 100-C in a wirelessly controlled network. The controlled circuits facilitate an automated self-commissioning process that substantially reduces the need for manual human commissioning. Furthermore, the topologies of the controlled circuits are such that retrofitting costs and electricity consumption by wireless adapters (as they are turned off when the lights are turned off and when lights are turned off, there is no need for the wireless adapter to remain on) are reduced relative to the full wireless adaptation of FIG. 1B.

For the purposes of illustration only, wireless controlled circuits 100 may conform to the ZigBee specification, which is based on the IEEE 802.15.4 standard. The IEEE 802.15.4 standard is a standard for low-rate wireless personal area networks (LR-WPANs). The ZigBee specification defines a suite of high level communication protocols that use low-power and low-bandwidth digital radios. The low power consumption and low bandwidth requirements of a ZigBee device reduces cost and prolongs battery life, and thus such devices are often used for sensors, monitors and controls. Other devices that communicate according to other wireless protocols can also be used, and thus the controlled circuits 100, can be constructed according to other types of wireless networks as well.

§2.0 Example Topologies

Figure 3C:
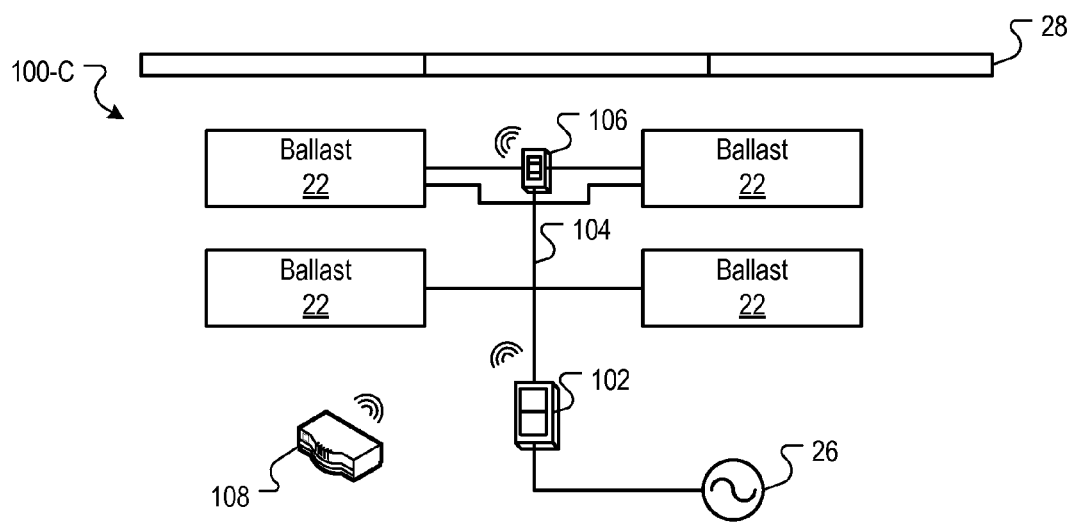

FIGS. 3A-3C are block diagrams illustrating controlled circuits 100 in a wirelessly controlled network. Each controlled circuit 100 facilitates automated commissioning by employing a topology that enables the removal of power to wireless devices (e.g., wireless adapters) while the wireless devices are in an uncommissioned state, and also when the wireless devices are in a commissioned state. In some implementations, each controlled circuit includes a switch device that controls the power to one or more wireless devices that the switch is intended to control wirelessly, and the ability to control the power to the wireless devices is preferably independent of the commissioned state of the wireless devices.

Figure 2:
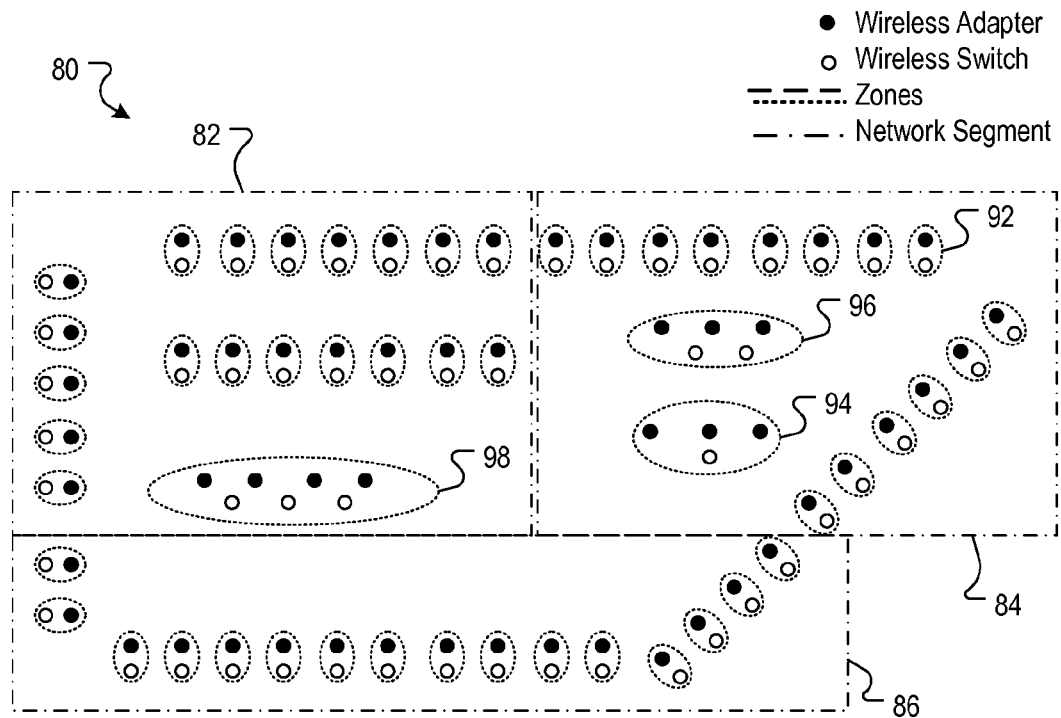
FIG. 2 is a block diagram illustrating a network of controlled circuits arranged by zones and network segments according to a floor plan.

Each of the controlled circuits 100 are representative of one of many controlled circuits that may be deployed in a building. For example, each controlled circuit 100 may be one of the many controlled circuits arranged according to the zones of FIG. 2 above. There may be additional wireless devices in the network, such as motion detectors, light sensors, thermostats, etc. However, to avoid congestion in the drawings, these wireless devices are not included in the illustrations of FIGS. 3A-3C.

With reference to FIG. 3A, the controlled circuit 100-A includes a switch device 102 that is connected to a power circuit (or power source) 26. The wiring 104 is referred to as the controlled circuit wiring 104, and the switch device 102 is configured to control power provided by the power circuit 26 to the controlled circuit wiring 104. The wireless adapter 106 is connected to the controlled circuit wiring 104, and also connected to a controlled device, such as ballasts 22.

In some implementations, the wireless network is a mesh type network, and thus which devices 102 have a built-in router functionality. The wireless adapters 106 do not need to have the router functionality, and can be realized by wireless devices that function as wireless endpoints. However, in some implementations, the adapters can include router functionality as well.

Both the switch device 102 and the wireless adapter 106 are configured to transmit and receive data wirelessly and to take one or more control actions in response to the received data and the transmitted data. In some implementations, the ballasts 22 are power supplies for lighting (such as a fluorescent ballast or LED driver), and the wireless adapters 106 can control the ballasts 22, thereby controlling power at the ballasts, i.e., can either condition the power or instruct the ballast 22 to condition the power to cause a lighting effect. For example, the wireless switch device 102 can have a dimmer control unit that transmits data to the wireless adapter 106.

The wireless adapter 106 can, in turn, transmit the received data and control power at the ballasts 22 to cause the dimming effect to occur.

In some implementations, the wireless adapter 106 is powered by the controlled circuit wiring 104 when the switch device 102 couples the power source 26 to the controlled circuit wiring 104, and has no power when the switch device 102 decouples the power source 26 from the controlled circuit wiring 104.

The topology of the controlled circuit 100 preserves most existing wiring, and only requires some re-wiring and wire termination to the wireless adapter 106 where enhanced controls are required. For example, in FIG. 3A-3C, the ballasts 22 near a window 28 are wirelessly adapted to enable "daylighting" control, which is a form of control where lights in areas where daylight is available are dimmed to take advantage of available daylight. However, no changes are introduced to the other ballasts 22 that do not need to offer enhanced controls. Other enhanced controls can also be provided by the wireless adapter 106 and the switch device 102, and, optionally, another commissioning device 108 that is only in wireless communication with the controlled circuit 100. The commissioning device 108 can be wireless router, network coordinator, or some other wireless device configured to provide control to the controlled circuit 100.

The topology of the controlled circuit 100-B of FIG. 3B is similar to that of the controlled circuit 100-A of FIG. 3A, except that two wireless adapters 106 are used. In the controlled circuit 100-B, two pairs of ballasts 22 are respectively controlled by the switch device 102, and, optionally, the additional commissioning device 108.

The topology of the controlled circuit 100-C of FIG. 3C is similar to that of the controlled circuit 100-A of FIG. 3A, except the wireless adapter 106 is wired in parallel with the ballast. In the example circuits 100-A and 100-B, the wireless adapters, in addition to controlling power at the ballasts 22, can also control power to the ballasts, i.e., can couple and decouple power to the ballasts in addition to conditioning power or instructing the ballast 22 to condition power. In FIG. 3C, however, the adapter only controls power at the ballasts 22, as power is coupled to the ballast 22 by a direct connection from the switch device 102.

For illustrative purposes, the depiction of the topologies of FIGS. 3A-3C illustrate the wireless adapters as being separate from the ballasts. However, the topologies of FIGS. 3A-3C apply to both separate wireless adapters 106 and wireless adapters 106 that are integrated into the ballasts 22.

§3.0 Commissioning

As will be described in more detail below, the control device 108 can implement the functions of a commissioning device, and is referred to throughout the remainder of this document as a "commissioning device." In general, any device that can perform commissioning functions is a commissioning device. A commissioning device can also perform other functions as well, e.g., a commissioning device can also function as a router, an intelligent switch device 102, etc.

Figure 4:
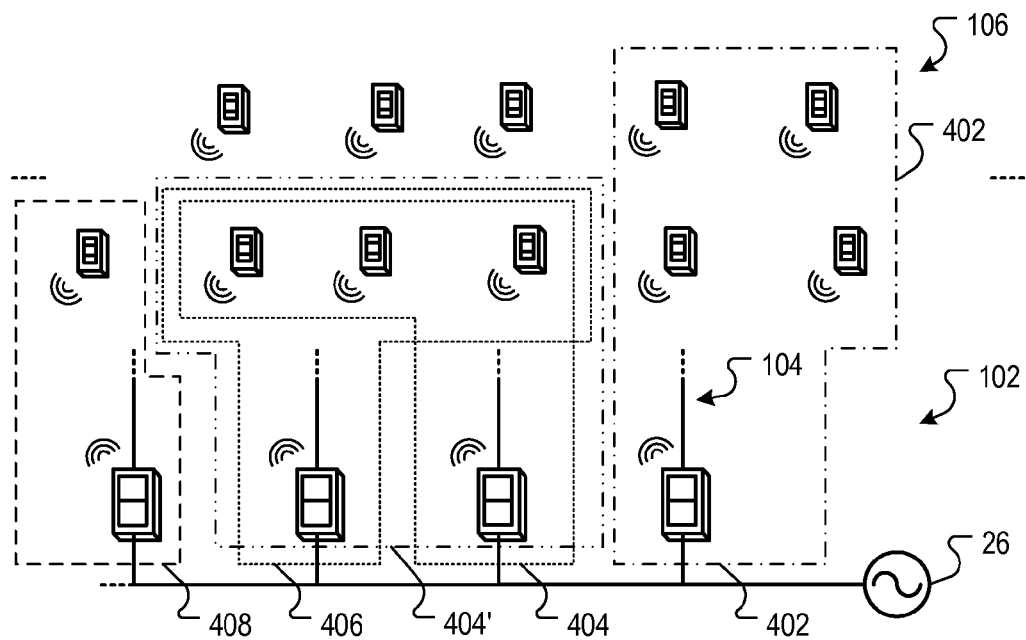
FIG. 4 is a block diagram illustrating an automated commissioning.
Figure 5:
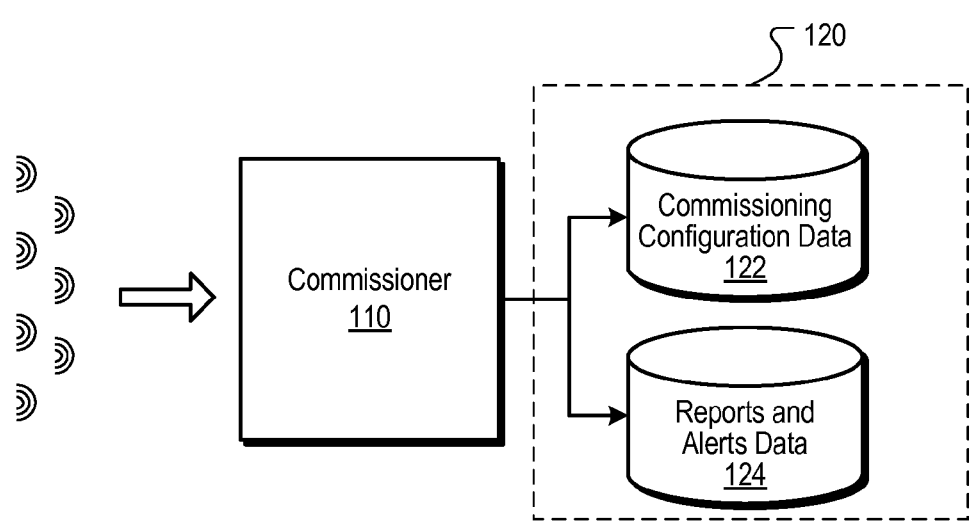
FIG. 5 is a block diagram of an example system that facilitates the automated commissioning of FIG. 4.

FIG. 4 is a block diagram illustrating an automated commissioning, and FIG. 5 is a block diagram of an example system that facilitates the automated commissioning of FIG. 4. The bounded regions 402, 404, 406 and 408 depict the actual controlled circuits, i.e., each bordered region represents a connection of a switch device 102, controlled circuit wiring 104, and wireless adapters 106 to form a controlled circuit 100. However, as the wireless network is initially uncommissioned, these connections are not readily apparent (except by manual inspection). The three wireless adapters that are not within a bordered region can, for example, belong to another controlled circuit 100, or may otherwise be wireless adapters that should not be included in the controlled circuits 100.

When there is more than one controlled circuit 100, as shown in FIG. 4, it is preferable that each controlled circuit 100 be represented as a logical entity to facilitate separate control of each controlled circuit 100. In some implementations, each controlled circuit 100, once identified, is assigned to a unique zone. As used herein, a "zone" represents a logical grouping of wireless devices that facilitates control of the devices as a single entity. For example, a group of devices can be associated with a group address that is unique to a particular zone. The zone configuration data can also include zone labels (e.g., zone names according to a zone labeling scheme, bindings, and/or device labels). However, manually determining which wireless adapters 106 and switching devices 102 belong to which controlled circuits is a time-consuming and labor-intensive process. Accordingly, the commissioning device 108 performs an automated commissioning process to reduce the time and labor requirements.

The commissioning device 108 includes a commissioner 110, which can, for example, be a software program. The commissioner 110 receives data from wireless adapters 106 joining the network and, from acknowledgments sent from wireless adapters 106 that have joined the network, determines which wireless adapters 106 belong to particular controlled circuits. The commissioner 110 generates commissioning and configuration data and persists the data in the commissioning data store 120. In some implementations, the commissioning data store 120 includes commissioning configuration data 122 and reports and alerts data 124.

The commissioning configuration data 122 stores a list of zones, and each zone is represented by a unique zone identifier. The zone specifies the switch device 102 and the wireless adapters 106 that belong to the zone. For example, the zone identifier can be a unique group address that is associated with the device identifiers (e.g., MAC addresses or some other unique identifier with respect to the wireless network) of the switch 102 and wireless adapters 106.

The reports and alert data 124 can include reports that the commissioner 110 can generate for system administrator for review. The reports can include alerts that specify wireless adapters 106 and/or switch devices 102 that, for one or more reasons, cannot be assigned to any particular zones.

The commissioning device 108, by use of the commissioner 110, commissions each controlled circuit 100 in the wireless network. In some implementations, the commissioning device 108 selects each controlled circuit 100 and determines for that controlled circuit the wireless adapters 106 connected to the controlled circuit wiring 104 of the controlled circuit. To select each controlled circuit 100, the commissioning device 108 selects each switch 102, as each switch controls a controlled circuit 100.

Figure 6:
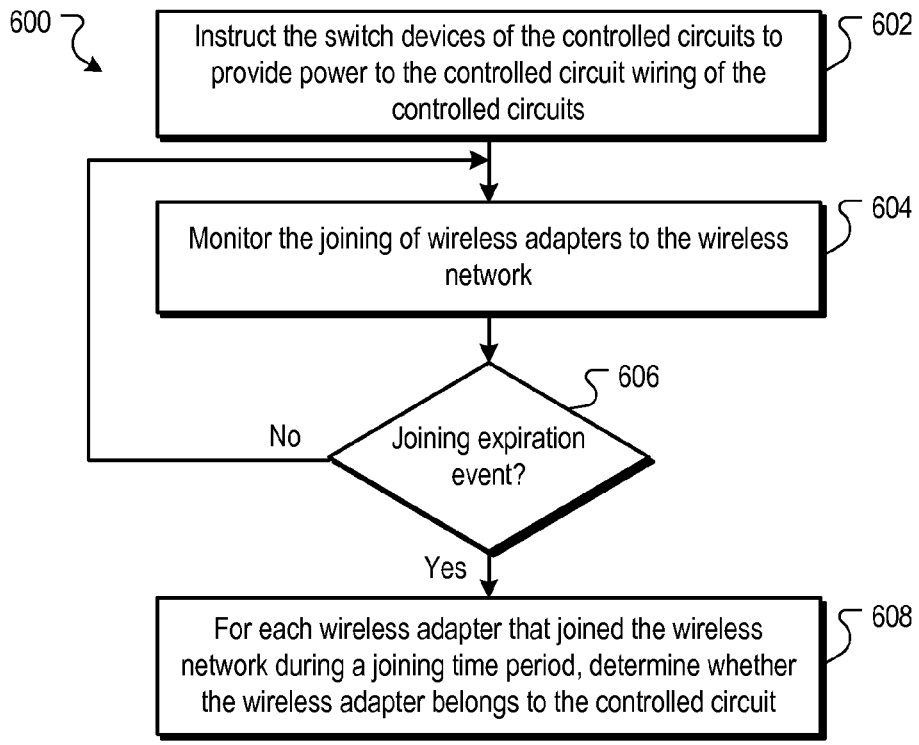
FIG. 6 is a flow diagram of an example process for commissioning controlled circuits.

The process of commissioning is described with reference to FIG. 6, which is a flow diagram of an example process 600 for commissioning controlled circuits. The process 600 can be implemented in the commissioning device 108. In general, the processes described below can be implemented one or more times during a commissioning processing. For example, devices are added to a system in batches, with one batch being added during each iteration. Additionally, even after all devices are commissioned, an administrator can re-execute the processes to verify a current commissioning state.

The process 600 instructs the switch devices of the controlled circuits to provide power to the controlled circuit wiring of the controlled circuits (602). For example, the commissioning device 108 can instruct each of the switch devices 102 of FIG. 4 to provide power to the controlled circuit wiring 104 and the controlled circuits.

The process 600 monitors the joining of wireless adapters to the wireless network (604). For example, in response to the switch devices 102 providing power to the controlled circuit wiring 104 the controlled circuits, the wireless adapters 106, which are in uncommissioned state, may attempt to join the wireless network. Alternatively, if the protocol in use requires a routing device to be instructed to allow the wireless devices to join the network before they can join, then the routing device (e.g., the switch 102) will be instructed to allow the wireless devices (e.g., the wireless adapters 106) to join the network. The wireless adapters 106 can communicate directly with the commissioning device 108, or indirectly by use of the switch devices 102. For example, as each switch device 102 can function as a wireless router, the wireless adapters 106 communicate with the switch devices 102 during the joining process. The switch devices 102, in turn, route the communications to the commissioning device 108.

The process 600 monitors for joining expiration event (606). In some implementations, the joining expiration event is the expiration of a predefined time period measured from instructing the switch devices of the controlled circuits to provide power to the controlled circuit wiring of the controlled circuits. In other implementations, the joining expiration event is the expiration of a predefined time period measured from the switch devices of the controlled circuits being instructed to allow the wireless adapters to join the network. The predefined time period is selected such that the wireless adapters 106 have sufficient time to join the wireless network. For example, a time period of 20 seconds can be used. In other implementations, each of the controlled circuits have an associated predefined number that defines a number of wireless adapters included in the controlled circuit, and the occurrence of the joining expiration event is the monitoring of a number of wireless adapters joining the wireless network that is equal to the predefined number associated with the controlled circuits. Other joining expiration events can also be defined.

The time during which wireless devices are joining the network until the occurrence of the joining expiration event is referred to as the joining time period. If the joining expiration event does not occur, the process 600 continues to monitor for the joining of wireless adapters to the wireless network. Conversely, if the joining expiration event does occur, then the joining time period ends, and for each wireless adapter that joined the wireless network during a joining time period, the process 600 determines whether the wireless adapter belongs to the controlled circuits (608).

How to determine whether or not a wireless adapter belongs to a controlled circuit can be done with positive tests, negative tests, or a combination of both positive tests and negative tests. A positive test is a test that identifies a wireless device as belonging to a controlled circuit when the wireless device responds to a message when the controlled wiring of the controlled circuit is powered, and the controlled circuit wiring for all other controlled circuits (if any) are not powered. A negative test is a test that identifies a wireless device as belonging to a controlled circuit when the wireless device for which communications have been verified does not respond to a message when the controlled circuit wiring of the controlled circuit is not powered, and the controlled circuit wiring for all other controlled circuits (if any) are powered.

Figure 7:
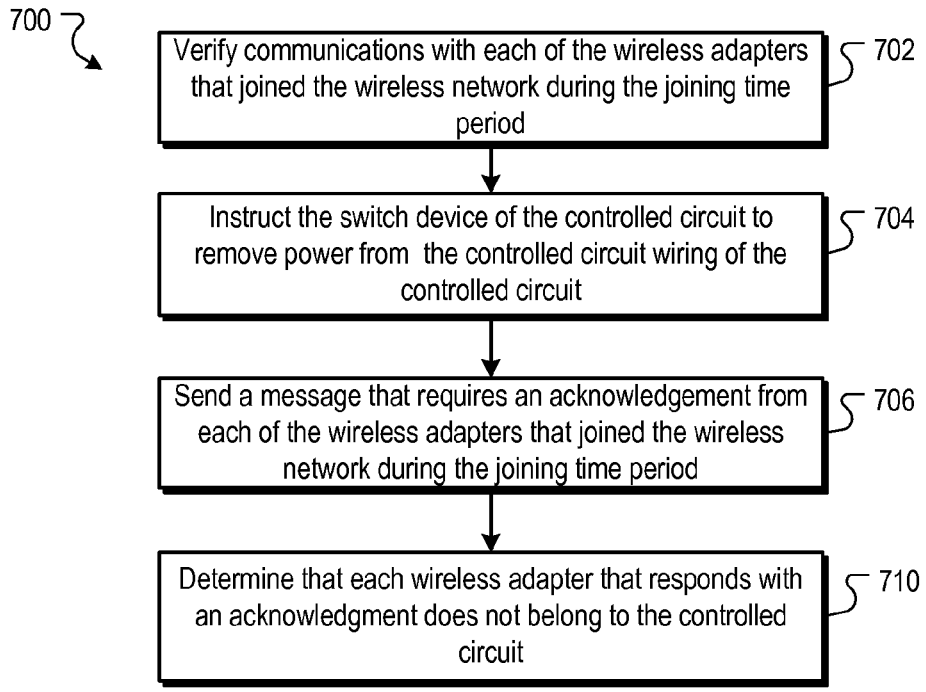
FIG. 7 is a flow diagram of an example process for determining whether wireless adapters belong to the controlled circuits.

FIG. 7 is a flow diagram of an example process 700 for determining whether wireless adapters belong to the controlled circuits. The process 700 can be implemented in the commissioning device 108, and is an example of a negative test.

The process 700 verifies communications with each of the wireless adapters 106 that joined the wireless network during the joining time period (702). For example, the commissioning device 108 can send a message that requires all receiving wireless adapters to respond by acknowledging receipt of the message. For example, if the protocol used supports a broadcast message requiring an acknowledgment, then a broadcast can be used. Alternatively, if the protocol used supports only group addressing or individual addressing, then messages can be sent to the groups or individual devices. Communications with the wireless adapter 106 is verified when the commissioning device 108 receives a response from the wireless adapter 106.

The process 700 instructs the switch device of the controlled circuit to remove power from the controlled circuit wiring of the controlled circuits (704). By doing so, the process 700 ensures that the wireless adapters that belong to the controlled circuit 100 are unpowered.

The process 700 sends a message that requires the same or similar type acknowledgment from each of the wireless adapters that join the wireless network during the joining time period (706). For example, the commissioning device can broadcast a message that requires all receiving wireless adapters to respond with an acknowledge message.

The process 700 determines that each wireless adapter that responds with an acknowledgment does not belong to the controlled circuit (710). Additionally, the process can likewise determine that each adapter that responded with an acknowledgment at step 702 and that does not respond with an acknowledgement in step 710 does belong to the controlled circuit As the wireless adapters 106 that belong to the controlled circuit 100 are not receiving power, they are unable to respond to the message. Accordingly, the responding wireless adapters cannot be connected to the controlled circuit wiring 104 as the controlled circuit wiring 104 is unpowered. Therefore, the responding wireless adapters 106 do not belong to the controlled circuit 100, and those that failed to respond the second time do belong to the controlled circuit.

The process 700 can thus be used to identify wireless adapters that do belong and do not belong to a particular controlled circuit 100. In particular, the process 700 is particularly suitable when there is only one switch device 102 in one controlled circuit 100. However, if there are multiple controlled circuits installed, the process 700 is iterated for each controlled circuit, i.e., each controlled circuit is selective powered and unpowered.

Figure 8:
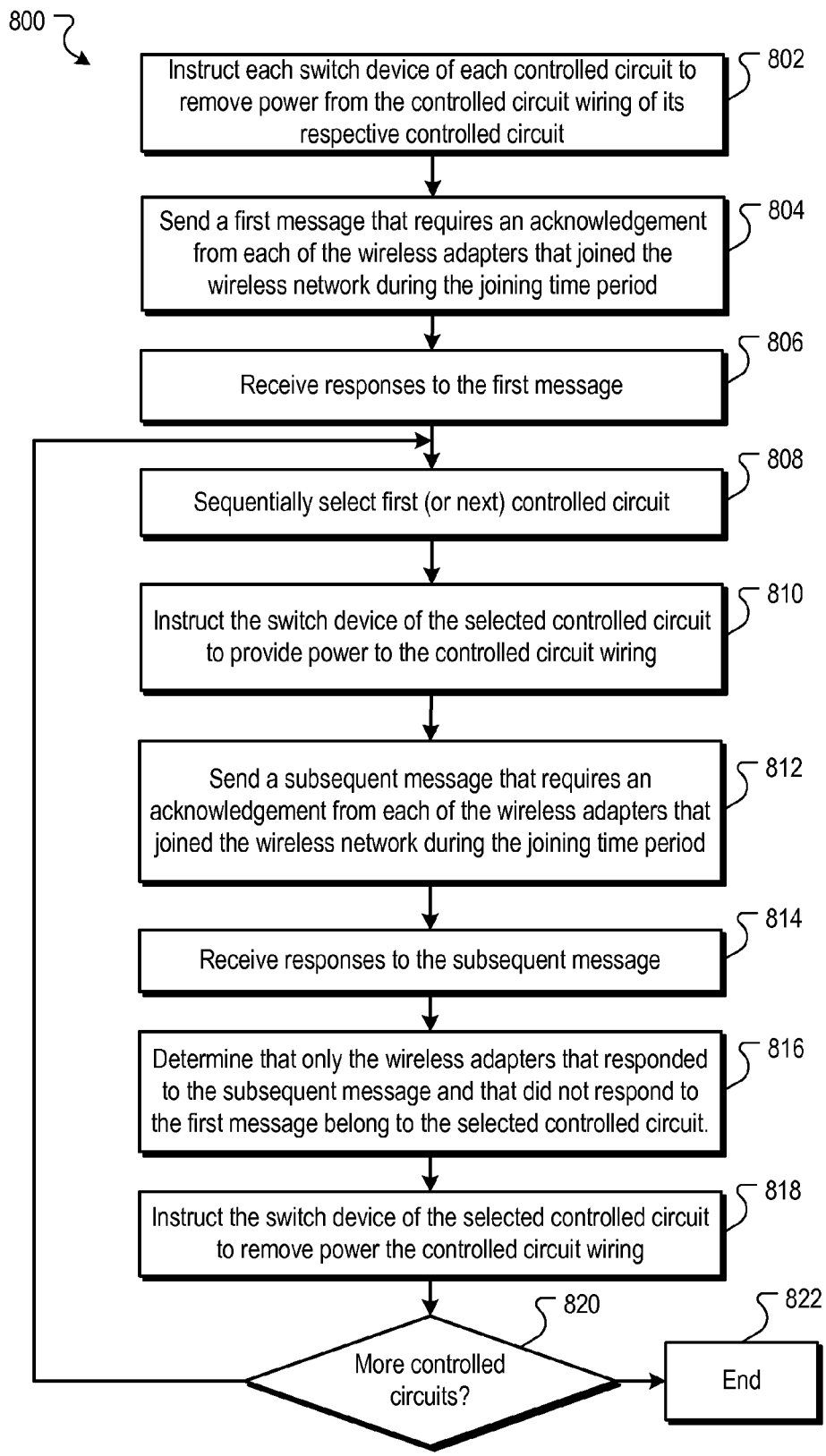
FIG. 8 is a flow diagram of another example process for determining whether wireless adapters belong to controlled circuits.

FIG. 8 is a flow diagram of another example process 800 for determining whether wireless adapters belong to controlled circuits. The process 800 applies a methodology similar to that of the process 700, and can be implemented in the commissioning device 108.

The process 800 instructs each switch device of each controlled circuits to remove power from the controlled circuit wiring of its respective controlled circuit (802). For example, with respect to FIG. 4, the commissioning device 108 instructs the switch 102 in the bounded regions for 402, 404, 406, and 408 to remove power from the controlled circuit wiring of its respective controlled circuit.

The process 800 sends a first message that requires an acknowledgment from each of the wireless adapters that joined the wireless network during the joining time period (804). For example, the commissioning device can send one or more messages to require all receiving wireless adapters to respond with an acknowledge message.

The process 800 receives responses to the first message (806). For example, the commissioning device 108 may receive responses from the wireless adapters that are not within any of the bounded regions in FIG. 4. These wireless adapters form a set of uncontrolled adapters, i.e., wireless adapters that are not on the controlled circuits undergoing the commissioning process.

The process 800 sequentially selects a first (or next) controlled circuit (808). For example, the commissioning device 108 can first select switch device 102 in the bounded region 402. Process steps 808-820 are then performed; thereafter, the commissioning device selects the switch device 102 in the bounded region 404, and the process steps 808-820 are then performed; and so on.

The process 800 instructs the switch device of the selected controlled circuit to provide power to the controlled circuit wiring (810). For example, the commissioning device 108 instructs the switch device 102 in the bounded region 402 to provide power to the controlled circuit wiring 104.

The process 800 sends a subsequent message that requires an acknowledgment from each of the wireless adapters that join the wireless network during the joining time period (812). For example, the commissioning device can send one or more messages that requires all receiving wireless adapters to respond with an acknowledge message. The subsequent message is sent for each iteration.

The process 800 receives responses to the subsequent message (814). For example, the commissioning device 108 will receive responses from the wireless adapters within the bounded region 402, and possibly other wireless adapters that may be powered by other means (e.g., the wireless adapters not within any bounded region seven FIG. 4, such as wireless adapters that do not belong to any controlled circuit 100).

The process 800 determines that only the wireless adapters that responded to the subsequent message and that did not respond to the first message belong to the selected controlled circuit (816). For example, the commissioning device 108 will determine that the wireless adapters 106 within the bounded region 402, which are the only wireless adapters that responded to the subsequent message and that did not respond to the first message, belong to the controlled circuit that includes the switch device 102 and the bounded region 402.

The process 800 instructs the selected switch device circuits to remove power from the controlled circuit wiring of its controlled circuit (818), and determines if there are additional controlled circuits to process (820). As the switches in the bounded regions 406 and 408 still need to be processed, the commissioning device 108 determines that more controlled circuits need to be processed and selects the switch device in the bounded region 406. Eventually no more controlled circuits need to be processed, and the process 800 ends (822).

In some implementations, step 818 can be omitted. As each controlled circuit is sequentially selected, the process 800 can determine that only the wireless adapters that responded to the most recent subsequent message and that did not respond to the first message or previous subsequent messages belong to the selected controlled circuit.

In some implementations, for each sequentially selected circuit, the commissioning device 108 generates a corresponding zone in the wireless network that specifies the switch device and the wireless adapters that belong to the zone. For example, after determining that the wireless adapters 106 and the bounded region 402 belong to the controlled circuit that includes the switch device 102 and the bounded region 402, the commissioning device 108 can generate zone data that specifies the wireless devices within the bounded region 402 as belonging to a particular zone.

The processes 600, 700 and 800, described above, are example commissioning processes. Other processes can also be used. For example, another example process can first determine all devices that joined during a joining time period, and assign these devices to a first set {A}. Note that devices in set {A} may include other devices that are not on controlled circuits but joined the network during the joining time period. The process can then determine all devices not on any controlled circuit, e.g., by removing power from all controlled circuits and sending messages requiring responses, and assign the responding devices to a second set {B}. The process can then iterate through the controlled circuits to determine, by use of positive or negative tests, all devices on each controlled circuit, and assign the devices to respective sets {C1}, {C2} ... {Cn}. A final set {C} is the union of all sets {C1}, {C2} ... {Cn}.

Under normal operation, the operation of {A}-{B}-{C} should result in an empty set at the end of the commissioning process. However, if this operation results in a non-empty set, then there are devices that joined and are in set {A} but are no longer in communication with the network. These devices did not respond when all controlled circuits were turned off to form set {B}, and did not respond when each controlled circuit was selective turned on to form each set {C1}, {C2}, ... {Cn}. Thus, there are devices that joined the network but have either left the network or have failed. The system can thus generate an error report for administrative review, and an administration can determine which, if any, corrective actions should be taken.

§3.1 Overlapping Zones

Figure 9:
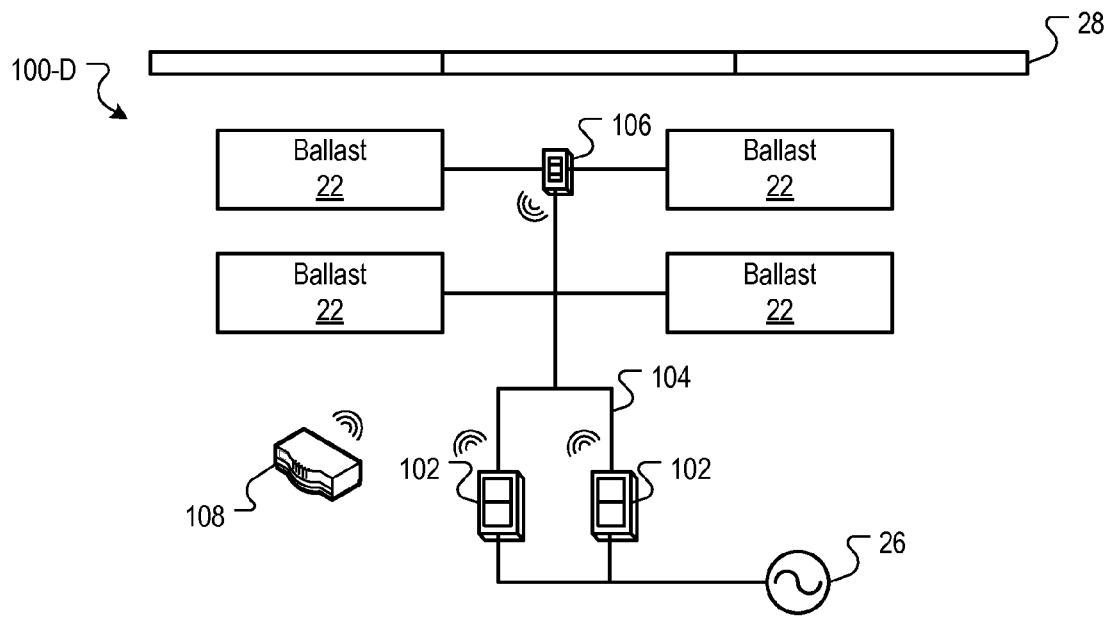
FIG. 9 is a block diagram illustrating a controlled circuit with two switches in a wireless network.

As shown in FIG. 4, the bounded regions 404 and 406 overlap with respect to the wireless adapters 106. This can occur, for example, when two (or more) switch devices control the same controlled circuit wiring 104. FIG. 9 is a block diagram illustrating a controlled circuit 100-D that is similar to the controlled circuits 100-A, 100-B and 100-C, except that two switch devices 102 are wired so that each control the controlled circuit wiring 104. For example, the switch devices 102 can be wired in a manner similar to a three-way switch configuration using two switches.

In some implementations, it is desirable to control the controlled circuit 100 is a logical entity. Accordingly, the commissioning device 108 can merge all of the wireless adapters 106 and switch devices 102 and the bounded regions 404 and 406 into one zone. To accomplish this, the commissioning device 108 implements a process that determines whether the wireless adapters 106 that are detected for a particular controlled circuit belong to an existing zone (or previously identified controlled circuit).

Figure 10:
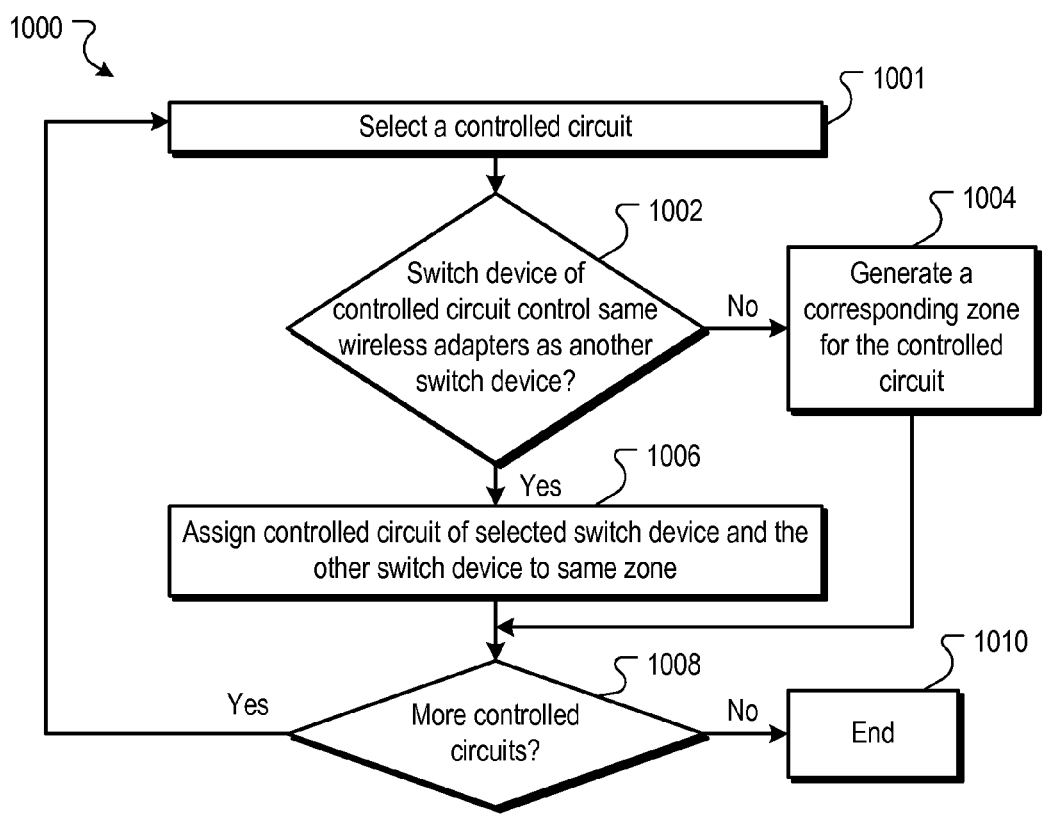
FIG. 10 is a flow diagram of an example process for assigning zones for controlled circuits.

FIG. 10 is a flow diagram of an example process 1000 for assigning zones for controlled circuits. The process 1000 can be used to merge two controlled circuits into a single zone, and can be implemented in the commissioning device 108. The process 1000 can, in some implementations, be implemented in parallel with the process 800 of FIG. 8.

The process 1000 selects a controlled circuit (1001). For example, the commissioning device 108 can select the switch device in the bounded region 404.

The process 1000 determines if the switch device of the selected controlled circuit controls the same wireless adapters as another switch device (1002). For example, the process 1000 can implement the steps described in FIG. 8 to identify the wireless adapters that belong to the controlled circuit that includes the switch device 102 and the bounded region 404. Once those wireless adapters 106 are identified, the process can compare the identified wireless adapters 106 to other wireless adapters that have already been identified and determined to belong to other controlled circuits.

For example, assume that the process 1000 is sequentially selecting the switches in the bounded regions 402, 404, 406, and 408. Accordingly, only the wireless adapters 106 in the bounded region 402 have been determined to belong to a controlled circuit. Accordingly, the wireless adapters in the bounded region 404 are compared to the wireless adapters in the bounded region 402. As none of the wireless adapters match (e.g., the wireless adapters not form a common subset), the commissioning device 108 determines that the switch device does not control the same wireless adapters as any other switch device that has been processed.

In response to this determination, the process 1000 generates a corresponding zone for the controlled circuit (1004). For example, the zone is generated for the wireless devices included in the bounded region 404.

The process 1000 determines if there are additional controlled circuits to process (1008). As the switches in the bounded regions 406 and 408 still need to be processed, the commissioning device determines that more controlled circuits need to be processed and selects the switch device in the bounded region 406.

The process 1000 determines if the switch device of the selected controlled circuit controls the same wireless adapters as another switch device (1002). For example, once the wireless adapters 106 in the bounded region 406 are identified, the process 1000 compares the identified wireless adapters 106 to other wireless adapters that have already been identified and determined to belong to other controlled circuits, i.e., the wireless adapters 106 that belong to the zone corresponding to the bounded region 404, and the wireless adapters 106 that belong to zone corresponding to the bounded region 402. As the wireless adapters 106 in the bounded regions 404 and 406 form a common set, the commissioning device 108 determines that the switch devices in the bounded regions 404 and 406 control the same wireless adapters.

In response to this determination, the process 1000 assigns the controlled circuit of the selected switch device in the other switch device to a same zone (1006). For example, the commissioning device 108 can merge the wireless devices in the bounded region 406 into the zone that corresponds to the bounded region 404. For example, the zone represented by the bounded region 404 can be expanded into a consolidated zone to include the switch device in the bounded region 406, as represented by the bounded region 404'.

In other implementations, each switch device can be processed for corresponding zone assignments, and after all the controlled circuits are processed, the zone data can be compared to determine which zones overlap. Overlapping zones can be consolidated into consolidated zones.

§3.2 Uncontrolled Wireless Adapters

In some situations, there may be wireless adapters 106 that do not belong to any of the controlled circuits 100 undergoing the commissioning process, and which are powered through the entire commissioning process. For example, in FIG. 4, assume the wireless adapters that do not belong to any of the bounded regions are wireless adapters that are designed to be powered on at all times and are not connected to any of the controlled circuits 100. Such wireless adapters 106 are referred to as uncontrolled wireless adapters, as they are outside the control of the controlled circuits 100. Note also that the uncontrolled wireless adapters may nevertheless be on other controlled circuits that are not undergoing the commissioning process (e.g., a block of controlled circuits 100 that have been previously commissioned).

The uncontrolled wireless adapters 106 may respond to messages from the commissioning device 108, especially if the uncontrolled wireless adapters 106 have not been joined to another wireless network prior to the commissioning process. For example, with respect to the process 800 above, uncontrolled wireless adapters may respond to the first message if those uncontrolled wireless adapters joined the network. Accordingly, there is a potential for the commissioning device 108 to incorrectly identify uncontrolled wireless adapters as belonging to a controlled circuit.

To further reduce the chances of this error occurring, several additional processes can be implemented. In one process, the commissioning device 108, prior to instructing the switch devices of the controlled circuits to provide power to the controlled circuit wiring to enable joining of wireless adapters to the wireless network, monitors for uncontrolled wireless adapters 106 that have already joined the wireless network, or that are attempting to join the wireless network. Once identified, the commissioning device 108 can ignore the responses of these uncontrolled wireless adapters. For example, all of the uncontrolled wireless adapters can be predetermined to not belong to any of the controlled circuits that are to be commissioned during the commissioning process.

Furthermore, in some situations, after the commissioning process is complete, there may be one or more wireless adapters 106 that were not initially detected as uncontrolled wireless adapters, but nevertheless have been determined to not belong to any of the controlled circuits. These wireless adapters can be identified as erroneous wireless adapters, e.g., flagged in an error report. The system administrator can review the error report and troubleshoot accordingly, e.g., can manually inspect the wireless adapters, or can commission the wireless adapters manually.

Additionally, in some situations, it is possible that at least one wireless adapter that belongs to one of the two or more controlled circuits that have a common set of wireless adapters does not belong to the common set of wireless adapters. For example, in FIG. 4, assume that one bounded region 406 includes one additional wireless adapter in addition to the three shown. In some implementations, an error message can be generated identifying this wireless adapter as an erroneous wireless adapter, and a system administrator can deal with the erroneous wireless adapter accordingly. In other implementations, the wireless adapter can be included in the merged zone, e.g., included in the zone 404'.

Alternatively, the wireless adapters 106 that are not assigned to any zone after the commissioning process can be instructed to leave the wireless network and join another wireless network set up, if one exists. For example, with respect to FIG. 2, several of the wireless adapters that belong to the network segment 82 may have inadvertently joined the network segment 86. After the commissioning process is executed, those wireless adapters will be determined not to belong to any of the controlled circuits located within the network segment 86. Accordingly, those wireless adapters can be instructed to leave the network segment 86, and seek to join a different network segment, e.g., network segment 82 or 84.

§4.0 Additional Implementations

The above examples are described in the context of multiple controlled circuits installation. However, the algorithms described above can be applied to single controlled circuits. For example, a consumer lighting package for easy retrofitting in a household environment or individual office environments can include one switch device 102 and one or more wireless adapters 106. For single switch device installation, the process 700 of FIG. 1 can be performed to identify the controlled circuit, and the commissioning functionality can be built into the switch device 102.

Additionally, the above examples are described in the context of the lighting control system. However, the wireless adapters can be any wireless adapter that can adapt any controlled device. For example, the wireless adapters can be HVAC controls, motion sensors, environmental sensors, photo sensors, or other wireless adapters that can be used to provide wireless control of the controlled device. Likewise, while example ballast 22 have been shown as control devices, other devices can also be controlled devices, such as furnaces, air conditioning units, and the like.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a personal digital assistant (PDA), a mobile audio or video player, to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can optionally be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers: A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

Figure 11:
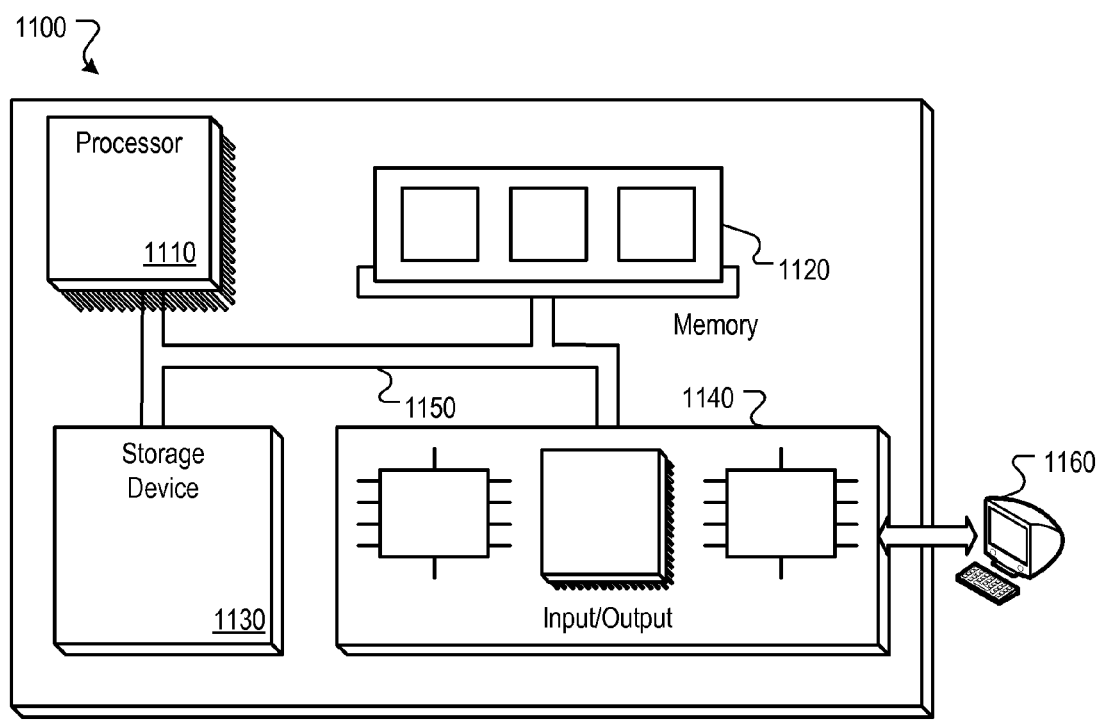
FIG. 11 is a block diagram of a programmable processing system.

An example of a computer in which the above-described techniques can be implemented is shown in FIG. 11, which shows a block diagram of a programmable processing system (system). The system 1100 can be utilized to implement the systems and methods described herein, i.e., the system 1100 can implement the commissioning 110 and the processes and functions of the commissioner 110 described above.

The system 1100 includes a processor 1110, a memory 1120, a storage device 1130, and an input/output device 1140. Each of the components 1110, 1120, 1130, and 1140 can, for example, be interconnected using a system bus 1150. The processor 1110 is capable of processing instructions for execution within the system 1100. In one implementation, the processor 1110 is a single-threaded processor. In another implementation, the processor 1110 is a multi-threaded processor. The processor 1110 is capable of processing instructions stored in the memory 1120 or on the storage device 1130.

The memory 1120 stores information within the system 1100. In one implementation, the memory 1120 is a computer-readable medium. In one implementation, the memory 1120 is a volatile memory unit. In another implementation, the memory 1120 is a non-volatile memory unit.

The storage device 1130 is capable of providing mass storage for the system 1100. In one implementation, the storage device 1130 is a computer-readable medium. In various different implementations, the storage device 1130 can, for example, include a hard disk device, an optical disk device, or some other large capacity storage device.

The input/output device 1140 provides input/output operations for the system 1100. In one implementation, the input/output device 1140 can include one or more of a wired network interface device, a serial communication interface device, and/or a wireless interface device. In another implementation, the input/output device can include driver devices configured to receive input data and send output data to other input/output devices, e.g., keyboard, printer and display devices 1160.

While this specification contains many specific implementation details, these should not be construed as limitations on the scope of any inventions or of what may be claimed, but rather as descriptions of features specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A system, comprising:
   a plurality of controlled circuits in a wireless network, each controlled circuit comprising:
      a switch device connected to a power circuit and connected to controlled circuit wiring, the switch device configured to control power provided by the power circuit to the controlled circuit wiring, to receive data wirelessly, to transmit data wirelessly and to take one or more control actions in response to the received data and the transmitted data;
      at least one wireless adapter connected to the controlled circuit wiring and connected to a controlled device, the wireless adapter powered by the controlled circuit wiring and configured to control power at the controlled device; and
   a commissioning device configured to receive data wirelessly and to transmit data wirelessly, and further configured to commission each controlled circuit, the commissioning comprising the operations of:
      instructing the switch devices of the controlled circuits to provide power to the controlled circuit wiring of the controlled circuits to enable joining of wireless adapters to the wireless network;
      monitoring the joining of wireless adapters to the wireless network;
      monitoring for the occurrence of a joining expiration event; and
      in response to the occurrence of the joining expiration event, determining whether each wireless adapter that joined the wireless network during a joining time period ending at the occurrence of the joining expiration event belongs to the controlled circuits.

2. The system of claim 1, wherein determining whether each wireless adapter that joined the wireless network during the joining time period belongs to the controlled circuits comprises:
   instructing each switch device of each controlled circuit to remove power to the controlled circuit wiring of its respective controlled circuit;
   sending a first message that requires an acknowledgement from each of the wireless adapters that joined the wireless network during the joining time period;

receiving responses from first wireless adapters that responds to the first message;

sequentially selecting each controlled circuit, and for each sequential selection of each selected controlled circuit:

instructing the switch device of the selected controlled circuit to provide power to the controlled circuit wiring of the selected controlled circuit;

sending a subsequent message that requires an acknowledgement from each of the wireless adapters that joined the wireless network during the joining time period;

receiving responses from second wireless adapters that respond to the subsequent message;

instructing the switch device of the selected controlled circuit to remove power from the controlled circuit wiring of the selected controlled circuit;

determining that only the wireless adapters that responded to the subsequent message and that did not respond to the first message belong to the selected controlled circuit.

3. The system of claim 2, wherein the commissioning device performs further operations comprising:

instructing each wireless adapter that does not belong to any selected controlled circuit to revert to an uncommissioned state.

4. The system of claim 2, wherein the commissioning device performs further operations comprising:

identifying wireless adapters that are attempting to join the wireless network prior to instructing the switch devices of the controlled circuits to provide power to the controlled circuit wiring of the controlled circuits to enable joining of wireless adapters to the wireless network; and determining that the identified wireless adapters that were attempting to join the wireless network prior to the instructing do not belong to any of the controlled circuits.

5. The system of claim 4, wherein the commissioning device performs further operations comprising precluding the wireless adapters that were identified as attempting to join the wireless network from joining the wireless network.

6. The system of claim 2, wherein the commissioning device performs further operations comprising, for each sequentially selected controlled circuit, generating a corresponding zone in the wireless network, the corresponding zone identified by a unique zone identifier that is unique to the sequentially selected controlled circuit, and the corresponding zone specifying the switch device and the wireless adapters that belong to the zone.

7. The system of claim 6, wherein the commissioning device performs further operations comprising:

determining that two or more switch devices control the same controlled circuit; and in response to the determination that the two or more switch devices control the same controlled circuit, assigning the two or more switch devices to a consolidated zone that includes the two or more switch devices and the one or more wireless adapters determined to belong to the two or more switch devices.

8. The system of claim 7, wherein determining that the two or more switch devices control the same controlled circuit comprises:

determining that the wireless adapters that belong to the controlled circuit for each of the two or more switch devices define a common set of wireless adapters.

9. The system of claim 8, wherein the commissioning device performs further operations comprising:

determining that at least one wireless adapter that belongs to one of the controlled circuits of the two or more switch devices does not belong to the common set of wireless adapters; and assigning the at least one wireless adapter in the consolidated zone based on the wireless adapter belonging to at least one of the controlled circuits for the two or more switch devices.

10. The system of claim 8, wherein the commissioning device performs further operations comprising:

determining that at least one wireless adapter that belongs to one of the controlled circuits of the two or more switch devices does not belong to the common set of wireless adapters; and generating an error message identifying the at least one wireless adapter as an erroneous wireless adapter.

11. The system of claim 1, wherein the occurrence of the joining expiration event is the expiration of a predefined time period measured from the instructing the switch devices of the controlled circuits to provide power to the controlled circuit wiring of the controlled circuits.

12. The system of claim 1, further comprising:

instructing switch devices to allow the wireless adapters to join the wireless network; and wherein the occurrence of the joining expiration event is the expiration of a predefined time period measured from the instructing the switch device to allow wireless adapters to join the wireless network.

13. The system of claim 1, wherein:

the controlled circuits have an associated predefined number that defines a number of wireless adapters included in the controlled circuits; and the occurrence of the joining expiration event is the monitoring of a number of wireless adapters joining the wireless network that is equal to the predefined number associated with the controlled circuits.

14. The system of claim 1, wherein determining whether each wireless adapter that joined the wireless network during the joining time period belongs to the controlled circuit comprises:

verifying communications with each of the wireless adapters that joined the wireless network during the joining time period;

instructing the switch devices of the controlled circuits to remove power to the controlled circuit wiring of their respective controlled circuits;

sending a message that requires an acknowledgement from each of the wireless adapters that joined the wireless network during the joining time period; and determining that each wireless adapter that joined the wireless network during the joining time period and that responds with an acknowledgment does not belong to the controlled circuits.

15. The system of claim 14, wherein the commissioning device performs further operations comprising, for each sequentially selected controlled circuit, generating a corresponding zone in the wireless network, the corresponding zone identified by a unique zone identifier that is unique to the sequentially selected controlled circuit, and the corresponding zone specifying the switch device and the wireless adapters that belong to the zone.

16. The system of claim 15, wherein the commissioning device performs further operations comprising:

determining that two or more switch devices control the same controlled circuit; and in response to the determination that the two or more switch devices control the same controlled circuit, assigning the two or more switch devices to a consolidated zone that includes the two or more switch devices and the one or more wireless adapters determined to belong to the two or more switch devices.

17. A computer-implemented method, comprising:
   selecting controlled circuits in a wireless network, each of the controlled circuits comprising:
      a switch device connected to a power circuit and connected to controlled circuit wiring, the switch device configured to control power provided by the power circuit to the controlled circuit wiring, to receive data wirelessly, to transmit data wirelessly and to take one or more control actions in response to the received data and the transmitted data;
      at least one wireless adapter connected to the controlled circuit wiring and connected to a controlled device, the wireless adapter powered by the controlled circuit wiring and configured to control power at the controlled device;
   instructing the switch devices of the controlled circuits to provide power to the controlled circuit wiring of the controlled circuits to enable joining of wireless adapters to the wireless network;
   monitoring the joining of wireless adapters to the wireless network;
   monitoring for the occurrence of a joining expiration event; and
   in response to the occurrence of the joining expiration event, determining whether each wireless adapter that joined the wireless network during a joining time period ending at the occurrence of the joining expiration event belongs to the controlled circuits.

18. The method of claim 17, wherein determining whether each wireless adapter that joined the wireless network during the joining time period belongs to the controlled circuits comprises:
   instructing each switch device of each controlled circuit to remove power to the controlled circuit wiring of its respective controlled circuit;
   sending a first message that requires an acknowledgement from each of the wireless adapters that joined the wireless network during the joining time period;
   receiving responses from first wireless adapters that responds to the first message;
   sequentially selecting each controlled circuit, and for each sequential selection of each selected controlled circuit:
      instructing the switch device of the selected controlled circuit to provide power to the controlled circuit wiring of the selected controlled circuit;
      sending a subsequent message that requires an acknowledgement from each of the wireless adapters that joined the wireless network during the joining time period;
      receiving responses from second wireless adapters that respond to the subsequent message;
      instructing the switch device of the selected controlled circuit to remove power from the controlled circuit wiring of the selected controlled circuit;
      determining that only the wireless adapters that responded to the subsequent message and that did not respond to the first message belong to the selected controlled circuit.

19. The method of claim 18, further comprising, for each sequentially selected controlled circuit, generating a corresponding zone in the wireless network, the corresponding zone identified by a unique zone identifier that is unique to the sequentially selected controlled circuit, and the corresponding zone specifying the switch device and the wireless adapters that belong to the zone.

20. The method of claim 19, further comprising:
   determining that two or more switch devices control the same controlled circuit; and
   in response to the determination that the two or more switch devices control the same controlled circuit, assigning the two or more switch devices to a consolidated zone that includes the two or more switch devices and the one or more wireless adapters determined to belong to the two or more switch devices.

21. The method of claim 20, wherein determining that the two or more switch devices control the same controlled circuit comprises determining that the wireless adaptors that belong to the controlled circuit for each of the two more switch devices define a common set of wireless adapters.

22. The method of claim 17, further comprising:
   identifying wireless adapters that are attempting to join the wireless network prior to instructing the switch devices of the controlled circuits to provide power to the controlled circuit wiring of the controlled circuits to enable joining of wireless adapters to the wireless network; and
   determining that the identified wireless adapters that were attempting to join the wireless network prior to the instructing do not belong to any of the controlled circuits.

23. The method of claim 17, wherein the occurrence of the joining expiration event is the expiration of a predefined time period measured from the switch device of the target controlled circuit providing power to the controlled circuit wiring.

24. A controlled circuit in a wireless network, comprising:
   a switch device connected to a power circuit and connected to controlled circuit wiring, the switch device configured to control power provided by the power circuit to the controlled circuit wiring, to receive data wirelessly, to transmit data wirelessly and to take one or more control actions in response to the received data and the transmitted data; and
   at least one wireless adapter connected to the controlled circuit wiring and connected to a controlled device, the wireless adapter powered by the controlled circuit wiring and configured to control power at the controlled device;
   wherein the switch device is further configured to commission the wireless providing power to the controlled circuit wiring of the controlled circuits to enable joining of wireless adapters to the wireless network;
   monitoring the joining of wireless adapters to the wireless network;
   monitoring for the occurrence of a joining expiration event; and
   in response the occurrence of the joining expiration event, determining whether each wireless adapter that joined the wireless network during a joining time period ending at the joining expiration event belongs to the controlled circuit.

25. The controlled circuit of claim 24, wherein determining whether each wireless adapter that joined the wireless network during the joining time period belongs to the target controlled circuit comprises:
   verifying communications with each of the wireless adapters that joined the wireless network during the joining time period;
   removing power from the controlled circuit wiring;

sending a message that requires an acknowledgement from each of the wireless adapters that joined the wireless network during the joining time period; and determining that each wireless adapter that joined the wireless network during the joining time period and that responds with an acknowledgment does not belong to the controlled circuit.

26. The controlled circuit of claim 24, wherein the switch device is further configured to:

identifying wireless adapters that are attempting to join the wireless network prior to providing power to the controlled circuit wiring of the controlled circuit; and determining that the identified wireless adapters that were attempting to join the wireless network prior to providing power to the controlled circuit wiring do not belong to the controlled circuit.

\* \* \* \* \*

UNITED STATES PATENT AND TRADEMARK OFFICE
CERTIFICATE OF CORRECTION

| | | |
|---|---|---|
| PATENT NO. | : 8,265,674 B2 | Page 1 of 1 |
| APPLICATION NO. | : 12/684576 | |
| DATED | : September 11, 2012 | |
| INVENTOR(S) | : Jason Yew Choo Choong et al. | |

It is certified that error appears in the above-identified patent and that said Letters Patent is hereby corrected as shown below:

In Claim 24, Line 55, Column 20, delete "the" and insert -- to the --, therefor.

Signed and Sealed this
Sixth Day of November, 2012

David J. Kappos
*Director of the United States Patent and Trademark Office*